United States Patent [19]

Rhodes et al.

[11] 4,092,666

[45] May 30, 1978

[54] MONOCHROME PRESENTATION OF DEMODULATED COLOR SIGNALS

[75] Inventors: Charles Wesley Rhodes, Beaverton; Philip Stephen Crosby, Portland, both of Oreg.

[73] Assignee: Tektronix, Inc., Beaverton, Oreg.

[21] Appl. No.: 749,581

[22] Filed: Dec. 10, 1976

[51] Int. Cl.² ............................................. H04N 9/62
[52] U.S. Cl. ..................................................... 358/10
[58] Field of Search ........................ 358/10, 30, 40, 64, 358/65

[56] References Cited

U.S. PATENT DOCUMENTS 2,828,355   3/1958   Luther, Jr. ............................... 358/10

*Primary Examiner*—Robert L. Richardson
*Attorney, Agent, or Firm*—Adrian J. La Rue; Kenneth M. Durk

[57] ABSTRACT

This invention relates to the display, in monochrome, of color television component decoded signals red, green and especially blue, and particularly to a method of displaying transmission and recording system produced defects of color television signals which gives improved visual perception of the defects in the chrominance signal thereof in National Television System Committee and Phase Alternation Line color television systems.

7 Claims, 5 Drawing Figures

MONOCHROME PRESENTATION OF DEMODULATED COLOR SIGNALS

BACKGROUND OF INVENTION

Heretofore, it has been demonstrated that the display of the decoded blue color signal on a color monitor, but cutting off the green and red beam currents of the display device, gives a display which is quite sensitive to distortions of the chrominance signal in National Television System Committee, hereinafter referred to as NTSC, and Phase Alternation Line, hereinafter referred to as PAL, color systems, and especially when those signals are recorded on, say, video tape recorders. The sensitivity of the "blue only" display is due, of course, to the formation of the NTSC and PAL video signals where the gain required of the demodulated blue minus luminance (B-Y) signal is 2.03, while that of the demodulated red minus luminance (R-Y) signal is 1.14, and that required of demodulated green minus luminance (G-Y) is less than unity.

The high gain afforded the decoded B-Y chrominance signal makes this particular signal the most sensitive to chrominance noise and distortions, green being the least sensitive. Thus, the blue only display is inherently more sensitive to noise than a display in full color due to the fact that with all three chrominance signals applied to the appropriate electron guns of the display device, along with the luminance signal, the constant luminance principle is observed, which tends to reduce the visibility of random noise in the NTSC and PAL systems. (For those desiring a further explanation of the constant luminance principle, see W. F. Bailey, "The Constant Luminance Principle in NTSC Color Television," Proceedings of the I.R.E., January, 1954, Volume 42, No. 1, Pages 60-66.)

However, in displaying the blue only signal, using the blue electron gun of the color picture tube, the brightness and visual acuity of the display leave much to be desired. Indeed, the human eyes' sensitivity to the standard blue color is low, the blue electron gun of the display device contributing but approximately eleven percent of the total luminance. However, by applying the "blue only" video signal to all of the electron guns of a typical three gun color picture monitor or display device, the resultant display can be very much brighter monochrome display. As the human eye has much better acuity to green than blue, the monochrome display is of increased sharpness as perceived by the human eye. Of course, in some color picture tubes, the design optimizes the spot size of the green electron beam because of the property of human vision.

Additionally, when observing human skin tones on the color picture monitor, operating so as to provide a monochrome picture composed of the decoded blue signal luminance plus blue minus luminance i.e., [Y + (B−Y)], these skin tones will appear somewhat darker grey than if only the luminance signal feeds the display device. That is, the B−Y signal is in the direction so as to reduce brightness when human skin tones are transmitted. This is because skin tones generate a chrominance signal at approximately one hundred three degrees (103°) relative to the B-Y axis, namely, the +I phase (In NTSC the color difference or chrominance signals are transmitted with a restricted bandwidth and these signals are transformed to other signals called I and Q signals before they are bandwidth restricted.), or nearly so.

Correspondingly, an improvement in the basic technique of displaying the "blue only" signal would be to matrix R-Y and B-Y signals to form +Q signal which being in phase quadrature to +I, would not darken flesh tone grey scale reproductions. Such a matrix operation is possible either by synchronously demodulating the chrominance signal along the Q axis (33° phase shift) or by matrixing decoded R-Y and B-Y signals in correct proportion.

As the displayed picture is in monochrome because all three electron guns are driven with the decoded blue signal, or Y+Q signal, it follows that it is possible to use a monochrome display device and drive it, the display device, with decoded blue signal or Y+Q. Here is provided essentially the same highly effective display of chrominance noise and distortion whereby a much simpler and less costly display device which affords economic advantages may be utilized.

SUMMARY OF THE INVENTION

The present invention therefor relates to the display of the blue color component of a color television composite video signal, though not exclusively, and particularly to a method of making a visual observation which gives improved perception of the defects in the chrominance signal by feeding the composite video signal to a relatively inexpensive monochrome display device which has provided therein a relatively inexpensive demodulator and matrix stage which extracts the blue component signal for display on the monochrome device or by feeding the blue color component signal to the other two electron guns of a three gun color display device, thereby presenting a monochrome picture of the blue image which is interpreted by the eye as being much brighter than the conventional blue only visual measurement. Video tape recorder head banding problems are therefore much more noticeable as is chrominance noise enabling critical assesment of picture quality to be made quite easily.

It is therefore an object of the present invention to provide a method of making a visual measurement which gives an improved visual perception of the defects in a chrominance signal which overcomes the disadvantages of known techniques.

It is another object of the present invention to provide a method of visually observing video tape recorder head banding and chrominance noise problems which is quite easily accomplished.

It is still yet another object of the present invention to provide a system for assessing picture quality of color television composite signals.

The subject matter of the present invention is particularly pointed out and distinctly claimed in the concluding portion of this specification. The invention, however, both as to organization and method of operation together with further advantages and objects thereof, may best be understood by reference to the following description taken in connection with the accompanying drawings wherein like reference characters refer to like elements. It is to be understood, however, that the embodiments shown and described sets forth various modes contemplated by the inventors and are not intended to be limiting nor exhausting of the invention, and are given for purposes of illustration in order that others skilled in the art may fully understand the invention and principles thereof and the means of applying it in practical use so that they may modify it in various forms, each as best may be suited to the conditions of the particular use.

DESCRIPTION OF THE INVENTION

Figure 1A:
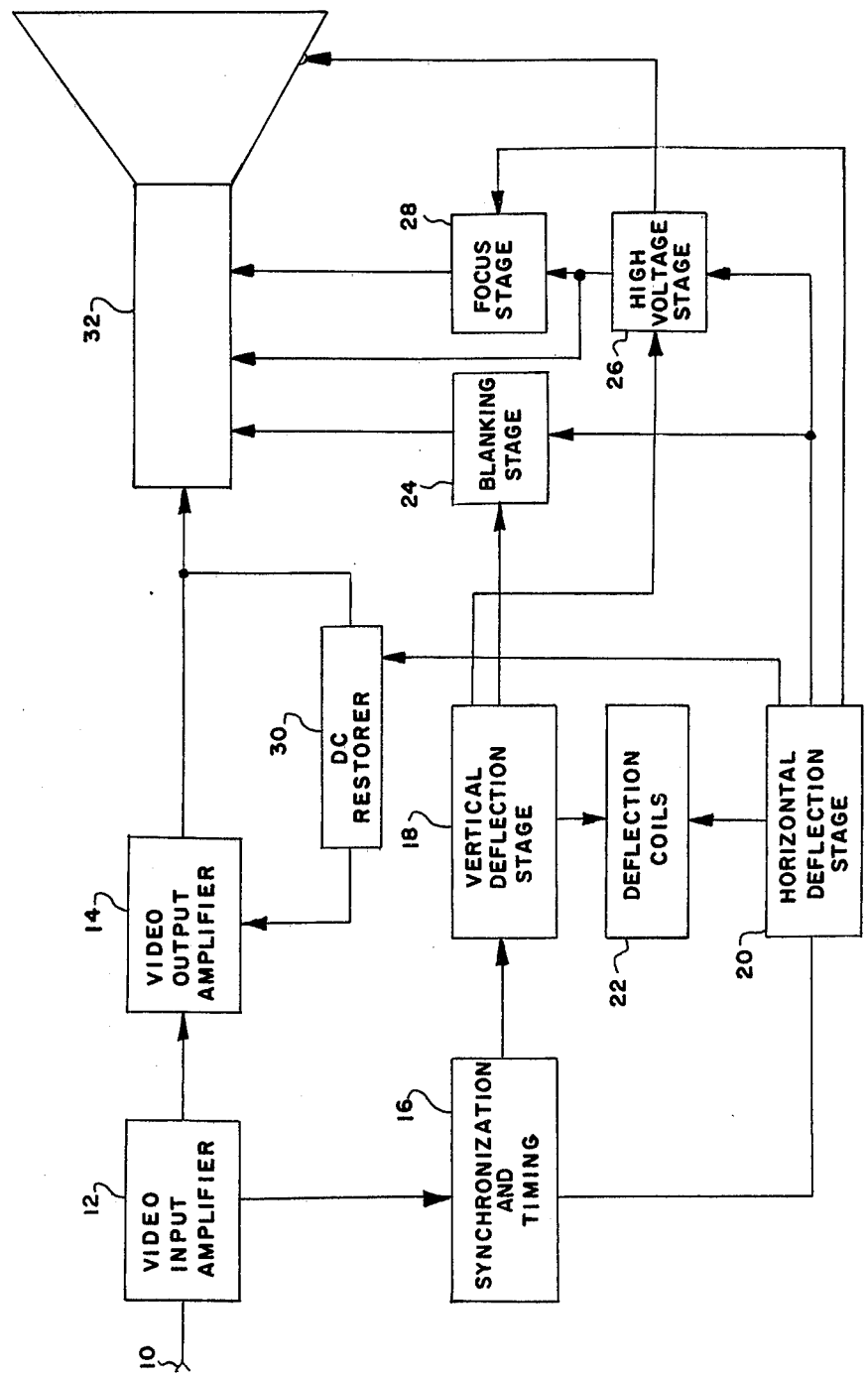
FIG. 1a is a block diagram of a conventional monochrome picture monitor for a television system.
Figure 1B:
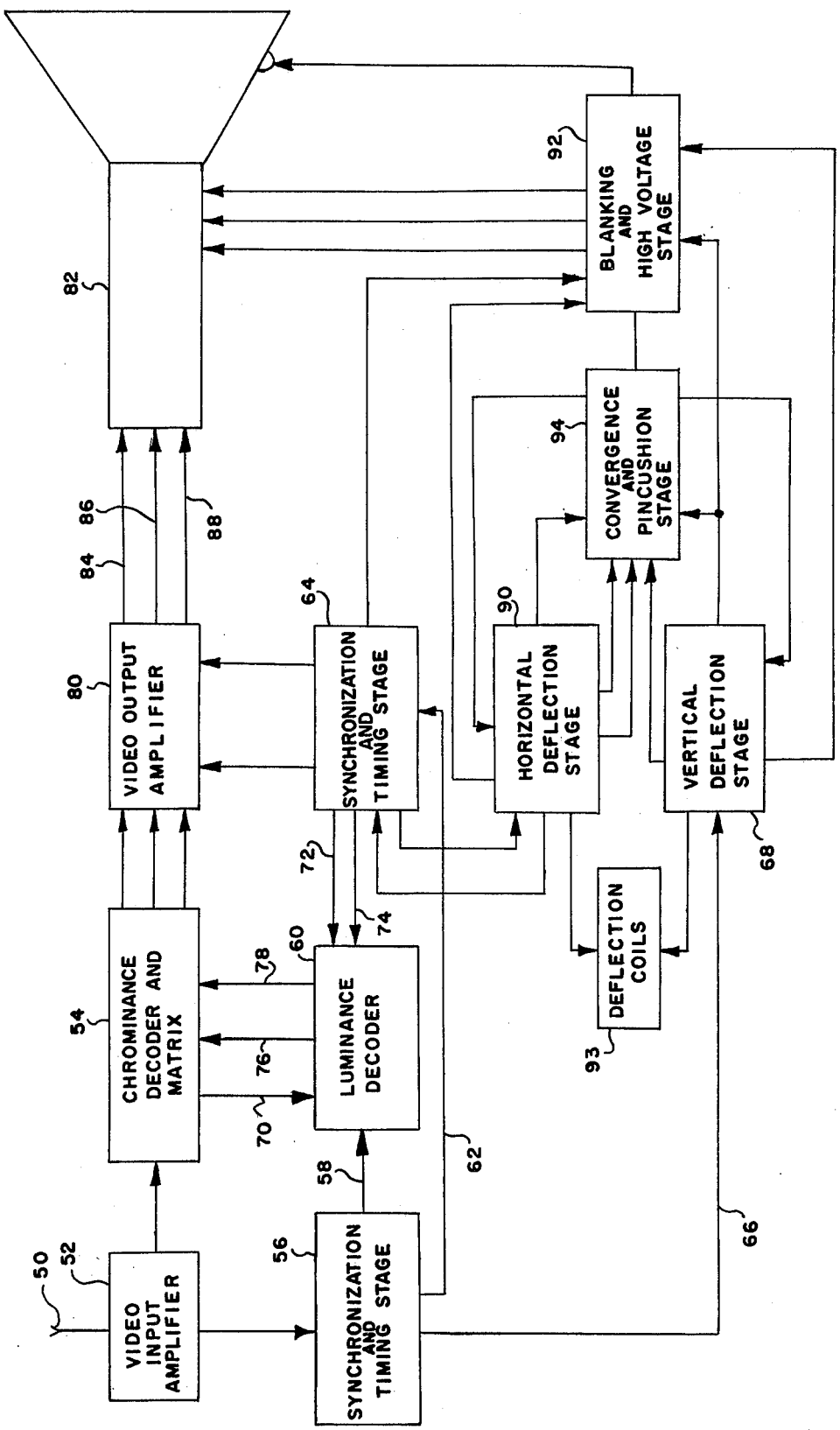
FIG. 1b is a block diagram of a conventional color picture monitor for a television system.

Referring to the drawings and in particular to FIG. 1a and FIG. 1b there are shown typical block diagrams for a monochrome and a color picture monitor respectively, for the display of a monochrome composite video signal and a color composite video signal. These embodiments are intended for the NTSC system but, of course, are not intended to limit the invention thereto. In the monochrome monitor, television signals in the form of composite video is applied at an input 10 for application to a video input amplifier 12 wherein the signal is amplified over a wide band of frequencies and processed for application to a video output amplifier 14. Additionally, this composite video signal is picked off and applied to a synchronization and timing stage 16.

As is well known, picture monitors are intended primarily for visual observation. Since the picture monitor is intended for observation only, the cathode-ray spot is time-referenced on two axes, the horizontal axis and the vertical axis, at fixed time rates to trace out a complete picture. The picture information, in the form of voltage waveform, is used to Z-axis modulate the intensity of the spot and synchronization pulses terminate the normal scanning motion of the cathode-ray tube spot. Thus, synchronization and timing stage 16 utilizes information contained as a portion of the composite video signal to generate vertical timing information for application to a vertical deflection stage 18 and information for application to a horizontal deflection stage 20.

Vertical deflection stage 18, responsive to vertical timing information obtained from synchronization and timing stage 16, generates the vertical deflection signal necessary to deflect the spot on the cathode-ray tube vertical axis via vertical deflection coils shown in the diagram as block 22. It is known, of course, that the deflection coils are physically located about the cathode-ray tube. Similarly, the horizontal deflection stage 20, responsive to the horizontal timing information obtained from synchronization and timing stage 16 generates the horizontal deflection signals to deflect the spot on the cathode-ray tube horizontal axis via horizontal deflection coils, also a portion of block 22. In addition to generating deflection signals, both the vertical and horizontal deflection stages provide outputs to a blanking stage 24 and a high voltage stage 26. Blanking stage 24 being responsive to both vertical and horizontal time related signals blanks, or turns off, the beam current of the cathode-ray tube during the vertical and horizontal blanking intervals, whereas high voltage stage 26 produces the high voltage potentials required for operation of the cathode-ray tube. A focus stage 28 is provided and generally utilizes a parabolic signal obtained from the horizontal deflection coils to control the beam of the cathode-ray tube as the beam moves or traverses the tube to focus same.

As has been previously stated, the picture information in the form of a voltage waveform is used to Z-axis modulate the intensity of the spot on the cathode-ray tube. The function of the video output amplifier is thus to provide the voltage waveform which is DC restored during horizontal blanking intervals via a DC restorer stage 30.

The output of the picture monitor is, of course, displayed on the faceplate of a cathode-ray tube 32; i.e., kinescope. Basically, the cathode-ray tube can be divided into five sections. A triode section furnishes a controllable source of electrons under the control of the voltage waveform obtained from the video output amplifier 14 which a focus section forms into an electron beam. This beam is deflected vertically and horizontally (by deflection coils generally) and may be accelerated in the acceleration section which is provided at a high voltage potential. The beam strikes a phosphor-covered screen located on one end of the cathode-ray tube and light is produced to thereby convert the various electrical signals to a visually observable display. These sections have not been shown in that they are well known and no further discussion thereof is believed necessary.

In the color monitor, color television chrominance component signals in the form of composite video is applied at an input 50 for application to a video input amplifier 52 wherein the signal is amplified over a wide band of frequencies and processed for application to a chrominance decoder and matrix stage 54. Additionally, the composite video signal is picked off and applied to a first synchronization and timing stage 56.

Synchronization and timing stage 56, in a color monitor, is utilized, basically, to generate signals which phase locks the horizontal blanking interval to the composite sync portion of the composite video signal, and depending upon the complexity of the monitor may provide signals which provides for a time shift of the vertical scan to enable display of the vertical blanking interval of the composite video input signal, it may provide signals which enables a time shift of the horizontal scan to enable display of the composite video input signal, it may provide phase correction signals to the horizontal scan to correct display alignment, or it may be utilized to enable display of the effects of random jitter and periodic changes in synchronization timing. In the figure, composite sync is available on the line 58 for application thereof to a luminance decoder 60 and on the line 62 to drive a second synchronization and timing stage 64. On the line 66 exists a vertical drive signal for driving the vertical deflection stage 68.

The luminance decoder 60 has the primary function of removing the luminance component of the composite video signal applied thereto via the line 70, delaying this luminance component an amount in time to enable chrominance processing and amplifying the luminance component level to the desired amplitude. This stage is directly under the control of timing signals such as horizontal blanking signals applied thereto via the line 72, horizontal control pulses via the line 74 and the composite sync via the already mentioned line 58. In addition to providing the luminance signal component of the composite video signal, the decoder provides clamping signals on the line 76 which are utilized by the chrominance decoder and matrix stage 54. The luminance signal is available on the line 78.

Chrominance decoder and matrix 54, responsive to the composite video signal applied via the video input amplifier 52 and the signals on lines 76 and 78, is utilized to reduce the color encoded signals to the basic color voltages for display. This stage generally includes the necessary subcarrier oscillator, demodulators, and the Red, Green and Blue Matrix necessary to provide decoded color currents that drive the video output amplifier 80. Video output amplifier 80, in turn, provides red, green and blue color-signal drive to the display device 82 via the lines 84, 86 and 88.

Horizontal deflection stage 90, vertical deflection stage 68, a blanking and power supply stage 92, and deflection coils stage 92 are basically as described for the monochrome monitor as previously mentioned and no further discussion thereof is believed necessary. It should be noted, however, that unlike the monochrome monitor, the color monitor requires a convergence and pincushion stage 94 which is used to provide dynamic magnetic convergence and correction signals to compensate for deflection distortion.

The display device 82, like the display device or cathode-ray tube 32, is also divided into five sections, but the tride section generally includes a plurality of controllable sources of electrons, each under control of the red, green and blue color-signal drives via the lines 84, 86 and 88. In addition, the phosphor-covered screen generally includes a plurality of phosphors to convert the various electrical signals to a visually observable color display.

Figure 2:
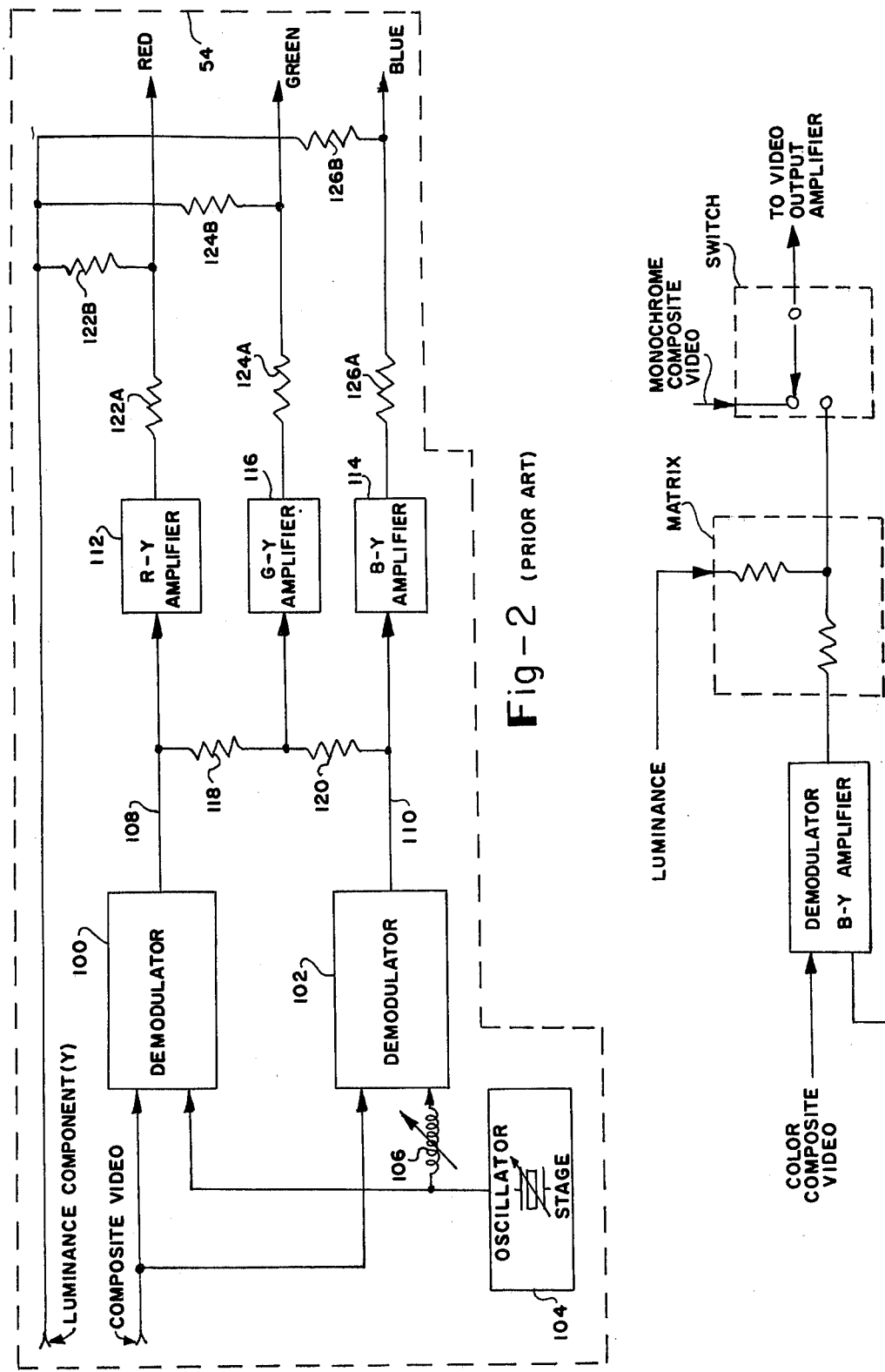
FIG. 2 is a simplified hybrid block and circuit diagram for the demodulator and matrix portions of a conventional color picture monitor.

Attention is now directed to FIG. 2 wherein there is shown a typical block diagram of the chrominance decoder and matrix stage 54 utilized in the FIG. 1b embodiment. Again, the block diagram shown is the decoder for an NTSC color signal, though not exclusively. As can be discerned, there is provided a first demodulator 100 and a second demodulator 102 which each simultaneously receive the composite video signal (from, say, video input amplifier 52 in the FIG. 1b embodiment) and a reference signal usually generated by a controllable crystal oscillator stage 104. In accordance with transmission characteristics of the NTSC system, the reference signal applied to demodulator 102 is, however, 90° out of phase with the reference signal used to drive demodulator 100 due to the inclusion of a variable quadrature control 106. Each demodulator is preferrably a differential device requiring both input chrominance (a component of the composite video signal) and regenerated subcarrier to operate and provide on the line 108 the color difference signal (R-Y) and the color difference signal (B-Y) on the line 110. The color difference signals are derived from three primary color video signals and are well known.

Both the R-Y and B-Y signals are then applied to a plurality of operation amplifiers defining an (R-Y) amplifier 112, a (B-Y) amplifier 114 and a (G-Y) amplifier 116. As is well known, the color difference (G-Y) is deduced from the color difference signals (R-Y) and (B-Y) via the resistive network comprising the resistors 118 and 120. The DC voltage outputs of these three operational amplifiers are then matrixed by resistively adding to these voltages the luminance component voltages of the composite video segment, delayed to allow chrominance processing, via the resistive network pairs comprising the resistors 122A and B, 124A and B, and 126A and B. The resultant signals are the red, green, and blue signal currents used to drive the video output amplifier 80.

Figure 3:
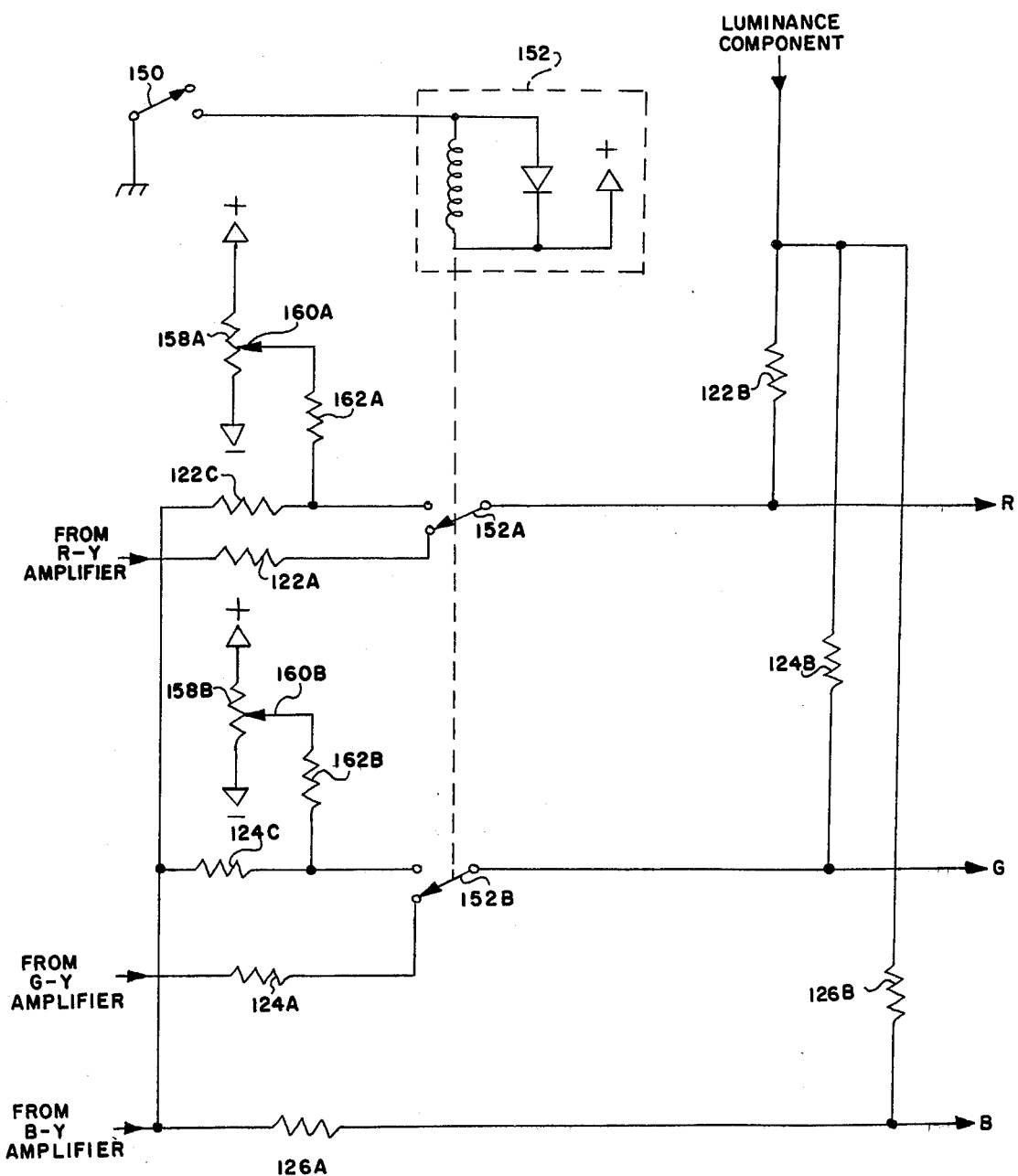
FIG. 3 is a circuit diagram of a means for observing system produced defects of the color television signal which gives improved visual perception of the defects according to the present invention.

In accordance with the object of the present invention, the display of the blue color signal is monochrome and particularly to a method of making a visual measurement which gives improved perception of the defects in the chrominance signal, there is shown in FIG. 3 a circuit for accomplishing the objects. This circuit is simply a means to route the current output of the B-Y amplifier to the resistive matrix so that only the demodulated blue color signal is applied to the plurality of controllable sources of electrons of the display device in the color monitor, or as is shown in FIG. 4, it is the addition of a simple demodulator stage in a monochrome monitor to provide the blue only signal to the electron gun thereof.

In FIG. 3, it can be seen that with the switches in the positions shown the R-Y, G-Y, and B-Y signals are matrixed via the resistor pairs 122A-B, 124A-B, and 126A-B and to provide red, green, and blue signal currents which are used to drive the video amplifier, and the monitor functions normally. If, however, a switch 150 conventionally located, say, on the front panel of the monitor, is moved from its first position (shown) to a second position thereof, a relay 152 is energized thereby moving relay switches 152A and 152B from the first (shown) position permitting the R-Y and B-Y to pass to a second position whereby the B-Y signal only is matrixed with the luminance signal via the resistor matrix now consisting of resistor pairs 122C-122B, 124C-124B, and 126A-126B where resistors 122C and 124C have identical values. To provide for DC offset, each second position of switch 152A and 152B is also coupled to a conventional source of variable potential derived, say, across a resistor 158 disposed between different sources of suitable potential (+, - on drawings) and having a movable center arm 160 for adjustably providing the potential via a resistor 162 connected in the second position of the switch associated therewith. No DC offset for the B-Y signal is shown in that the conventional B-Y offset is utilized.

Figure 4:
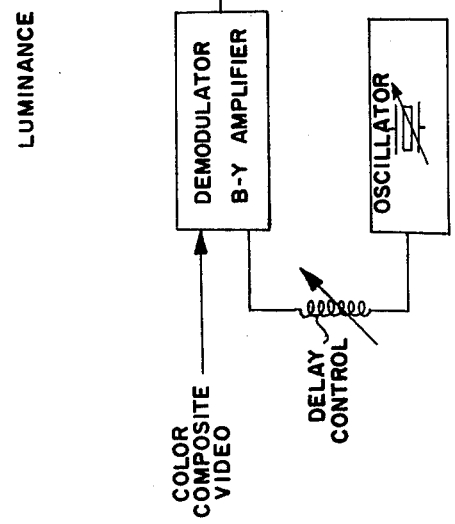
FIG. 4 is a simplified hybrid block and circuit diagram for enabling the defects of color television signals to be observed on a monochrome picture monitor in accordance with the present invention.

Referring now to FIG. 4 there is shown the additional stages required for displaying the blue signal in monochrome. Having described the units above, no further explanation is believed necessary to enable any person skilled in the art to make and use the invention.

It may be observed in studying the foregoing specification that the same has not been burdened by the inclusion of large amounts of detailed and specific information relative to such matters as circuitry, values, memory structure, logic and timing, and the like of the conventional monitors, since all such information is basically well within the skill of the art as of present date. Examples of technical publications already in existence and relating to all such aspects except for the novel features described above for those desiring to relay thereon may do so by referring to the following: "670, 671 & 672 Color Picture Monitors", copyright 1974 by Tektronix, Inc. for color picture monitors use in television production and transmission facilities; "630 Picture Monitor", copyright 1971 by Tektronix, Inc. for Monochrome picture monitors used in television production and transmission facilities; "Colour Television" Volume 2, PAL, SECAM and other systems first published in 1969 by Iliffe Books Ltd. for WIRELESS WORLD, copyright by P. S. Carnt and G. B. Townsend, 1969; "Television Waveform Processing Circuits" CIRCUIT CONCEPTS, copyrighted by Tektronix, Inc. 1968; "Television Systems Measurements" MEASUREMENT CONCEPTS, copyrighted by Tektronix, Inc. 1969; "Cathode-Ray Tubes", CIRCUIT CONCEPTS, copyrighted by Tektronix, Inc. 1967; U.S. Pat. Nos. 3,699,256; 3,719,772; 3,739,801; 3,810,026 and 3,863,264 and in copending U.S. Pat. application Ser. No. 720,854 filed Sept. 7, 1976; "Basic Television", by Bernard Grob, third edition, McGraw-Hill, New York, 1964; "Pulse, Digital, and Switching Waveforms", by Jacob Millman and Herbert Taub, McGraw-Hill, New York, 1965; and "SECAM Color T.V. System", Imprimeru Nord-Graphique, Parish - $10^e$.

Thus, from the above it can be discerned that a monochrome picture monitor, equipped with an NTSC or PAL decoder (or both) represents a specific embodiment of the present invention as does a color picture monitor intended for NTSC or PAL (or both), so arranged that all three electron guns may be driven with the decoded blue color signal represents another specific embodiment of the present invention. Additionally, a color picture monitor intended for NTSC or PAL (or both), so arranged that all three electron guns may be driven by the luminance signal and a signal decoded along approximately the +Q chrominance signal axis would represent another embodiment of the invention.

While there has been shown and described the preferred embodiments according to the present invention, it will be apparent to those skilled in the art that many changes and modifications may be made from the invention in its broader aspects. For example, it is possible to utilize a monochrome picture monitor without the need of a controlled oscillator and demodulator if the blue signal component is available from an existing source. Additionally, any one of the color components could be utilized, with minor changes to circuit values of the matrix, to increase the visual perception of measurements made therewith. Therefore, the appended claims are intended to cover all such changes and modifications that fall within the true spirit and scope of the invention.

The invention is claimed in accordance with the following:

1. In a method for displaying system produced defects of color television composite video color decoded component signals wherein the decoded signals are applied to separate electron guns of a color display device, the improvement comprising:
 applying one of the decoded signals to each of the separate electron guns to thereby improve the visual perception of the defects on the display.

2. The method according to claim 1 wherein said one of the color component signals is the blue color component signal.

3. The method according to claim 2 wherein said blue color component signal is displayed in monochrome.

4. A method for displaying system produced defects of color television composite video signals, comprising:
 providing a monochrome display device for visually displaying the defects, said display device including a single electron gun;
 processing the composite video signals to provide primary color decoded component signals; and
 applying one of said color decoded component signals to said electron gun to thereby provide visual perception of the defects on said display device.

5. A system for displaying system produced defects of color television composite video color decoded component signals wherein the decoded signals are applied to separate electron guns of a color display device, comprising:
 means for applying one of the decoded signals to each of the separate electron guns to thereby improve the visual perception of the defects on the display.

6. In a method for displaying system produced defects of color television decoded component signals wherein decoded component signals are applied to electron control means for controlling color details of a display device, the improvement comprising:
 applying one of the decoded components to the electron control means so that the electron control means causes the highest visual perceived brightness to thereby improve the visual perception of the defects on the display.

7. In a method for displaying system produced defects of color television composite video color decoded component signals wherein decoded signals are applied to separate electron guns of a color display device, the improvement comprising:
 applying one of the decoded component signals to at least one of the other electron guns to thereby improve the visual perception of the defects on the display.

* * * * *